United States Patent
Dakroub (10) Patent No.: US 6,738,208 B2
(45) Date of Patent: May 18, 2004

(54) MICROWAVE NOISE TESTING CIRCUIT FOR A DISC DRIVE

(75) Inventor: Housan Dakroub, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/175,428

(22) Filed: Jun. 19, 2002

(65) Prior Publication Data

US 2003/0081335 A1 May 1, 2003

Related U.S. Application Data

(60) Provisional application No. 60/340,996, filed on Oct. 30, 2001.

(51) Int. Cl.[7] ............................................. G11B 27/36
(52) U.S. Cl. ........................... 360/31; 360/46; 360/66; 360/67; 324/210
(58) Field of Search ............................ 360/31, 46, 66, 360/67; 324/210, 212, 226, 252

(56) References Cited

U.S. PATENT DOCUMENTS

| | | | | |
|---|---|---|---|---|
| 4,544,880 A | * | 10/1985 | Nagy et al. ............... | 324/642 |
| 5,305,000 A | * | 4/1994 | Harris ....................... | 343/786 |
| 5,841,318 A | * | 11/1998 | Cram ........................ | 330/9 |
| 6,150,876 A | | 11/2000 | Ngo | |
| 6,225,801 B1 | | 5/2001 | Jin et al. | |
| 6,226,137 B1 | | 5/2001 | Ngo | |
| 6,275,347 B1 | | 8/2001 | Ngo et al. | |
| 6,341,046 B1 | * | 1/2002 | Peterson ................... | 360/67 |
| 6,535,430 B2 | * | 3/2003 | Ogura et al. ............. | 365/185.23 |

OTHER PUBLICATIONS

"Sub-Nano Telsa In-Plane Vector Magnetometer Employing Single Magnetoresistor", Paperno et al, IEEE-1996.*

* cited by examiner

*Primary Examiner*—Alan T. Faber
(74) *Attorney, Agent, or Firm*—Fellers, Snider, et al.

(57) ABSTRACT

A preamplifier circuit of a preamp configured for measuring microwave noise of a magnetoresistive element biased by a pair of current sources is disclosed. In a preferred embodiment, the preamplifier circuit includes a differential amplifier disabled from the preamplifier circuit by a amplifier bypass switch, one of the pair bias current sources disabled from the preamplifier circuit and referenced to ground by a current bypass switch, a test point communicating with the amplifier bypass switch providing single ended access to the biased magnetoresistive element for measuring the microwave noise of the biased magnetoresistive element relative to the ground reference and a ground point communicating with the ground reference providing the ground reference for measuring the microwave noise of the biased magnetoresistive element.

22 Claims, 5 Drawing Sheets

BW = 100MHz - 6GHz

FIG. 4

BW = 100MHz - 6GHz

BW = 100MHz - 6GHz

MICROWAVE NOISE TESTING CIRCUIT FOR A DISC DRIVE

RELATED APPLICATIONS

This application claims priority to U.S. Provisional Application No. 60/340,996 filed Oct. 30, 2001, entitled Preamp With Microwave Noise Testing Circuits.

FIELD OF THE INVENTION

This invention relates generally to the field of magnetic data storage devices, and more particularly, but not by way of limitation, to a microwave noise testing circuit for testing data transducing heads of a disc drive.

BACKGROUND

Disc drives are used for data storage in modern electronic products ranging from digital cameras to computers and network systems. Typically a disc drive includes a mechanical portion and an electronics portion in the form of a printed circuit board assembly that controls functions of the mechanical portion while providing a communication interface to a host being serviced by the disc drive.

Typically, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magneto resistive read/write head that writes data to and reads data from the recording surface. Normally, the magneto resistive read/write head uses an inductive element, or writer, to write data to and a magneto resistive element, or reader, to read data from the recording surface.

The disc drive market continues to place pressure on the industry for disc drives with increased capacities, higher data rates and lower costs. A key aspect of achieving lower costs is an identification of marginal components as early as practical in the manufacturing process to preclude needless accrual of additional manufacturing costs and costly rework operations in subsequent processes.

A critical component of a disc drive is the magnetorestive read/write head. As each read/write head passes through manufacturing processes in preparation for use in a disc drive, costs associated with those processes accrue and contribute to the overall cost of the disc drive. By measuring characteristics of the read/write head throughout the manufacturing process, defective and marginal read/write heads can be culled from the process before additional costs are needlessly applied.

Read/write head testing methodologies such as ABHV (Analog Buffered Head Voltage) and RHBUFF (Read Head Buffered) have been employed to cull substandard read/write heads from the process. However, in application each methodology has shortcomings. The ABHV methodology involves modifications to the pre-amplifier to allow low frequency testing of the magneto-resistive element of the read/write head via a HAT tester (Head Assembly Tester) prior to assembly of the actuator assembly into a basedeck of the disc drive. Using the ABHV methodology, a bias current substantially similar to the bias current used during operation of a disc drive, is applied to the MR element. Next, the read/write head is enveloped in a magnetic field generated by an external coil, and a low frequency noise response of the read/write head is monitored. While useful, the ABHV methodology lacks sufficient selectivity to assess the condition of magnetorestive element.

The RHBUFF methodology is more selective, but requires extensive modifications to the pre-amplifier and special bias circuits, which lower the noise contribution from the bias circuits to the test results. During testing, a substantially noise free bias current is applied to the MR element and a mid-range frequency response of the MR element is monitored. Correlation between the test results of the RHBUFF methodology and actual performance of the read/write head in a disc drive environment is tentative.

As such, challenges remain and a need persists for effective techniques for identifying, testing and predicting operating characteristics of read/write heads throughout the disc drive manufacturing process. It is to this and other features and advantages set forth herein that embodiments of the present invention are directed.

SUMMARY OF THE INVENTION

As exemplified by preferred embodiments, the present invention provides a pre-amplification circuit of a disc drive adapted to provide access for measurement of a microwave noise response of a magnetoresistive element of a read/write head responding to an application of a bias current applied across the magnetoresistive element. These and various other features and advantages, which characterize the present invention, will be apparent from a reading of the following detailed description and a review of the associated drawings.

DETAILED DESCRIPTION

Figure 1:
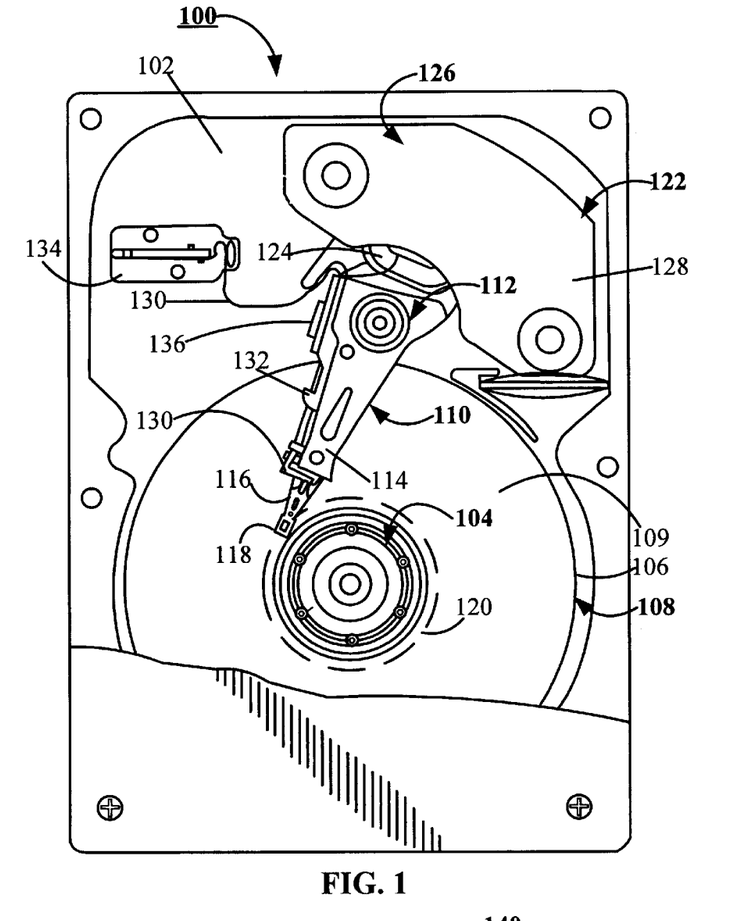
FIG. 1 is a top plan view of a disc drive that incorporates a pre-amplifier with a microwave noise test circuit adapted for use in assessing a condition of a magnetoresistive element of a read/write head of the disc drive in accordance with the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 accommodate head position control information written to embedded servo sectors (not separately depicted). Between the embedded servo sectors are data sectors used for storing data in the form of bit patterns. The read/write head 118 includes a reader element (not separately shown) offset radially and laterally from a writer element (not separately shown). The writer element writes data to the concentric information tracks 120 while the reader element controls the positioning of the read/write head 118 relative to the concentric information tracks 120 during write operations. During read operations the reader element reads data from the concentric information tracks 120 for passage to a host (not shown) serviced by the disc drive 100 and for use by a servo control system.

The term "servoing" or "position-controlling," as used herein, means maintaining control of the read/write head 118 relative to the rotating recording surface 109 during operation of the disc drive 100. When servoing to or servoing on a selected information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surface 109.

To provide the requisite electrical conduction paths between the read/write head 118 and read/write circuitry of the disc drive (not shown), read/write head wires (not shown) affixed to the read/write head 118 are attached to a read/write flex circuit 130. The read/write flex circuit 130 is routed from the load arm 116 along the actuator arm 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) typically mounted to the underside of the basedeck 102.

The flex circuit containment channel 132 also supports read/write signal circuitry including a preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
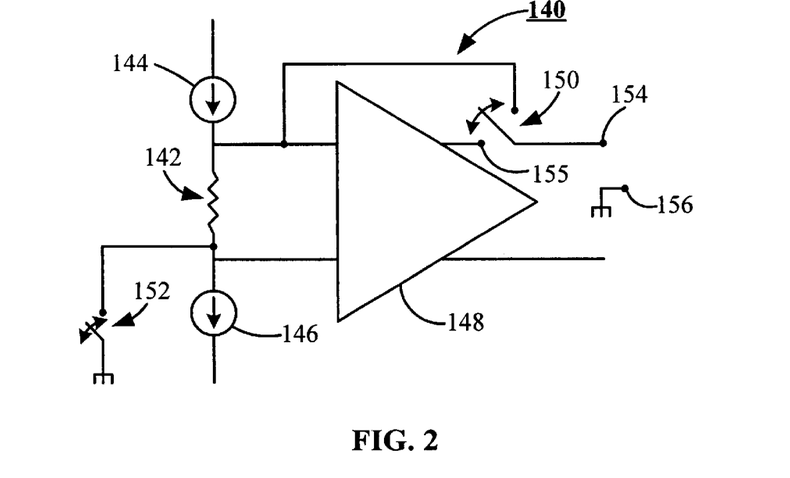
FIG. 2 is a circuit diagram of the test circuit of the pre-amplifier of the disc drive of FIG. 1.

FIG. 2 shows a circuit diagram of a single ended microwave noise test circuit 140 of the preamp 136 for use in measuring a ferromagnetic resonance frequency of a magnetoresistive read (MR) element 142 of the read/write head 118 of the disc drive 100. In a preferred embodiment an energy source 144, such as a bias current source 144 operating in a range of 2 to 5 milliamps applies a bias current to an upstream side of the MR element 142. Additionally, an energy source 146, such as a bias current source 146 applies a bias current of substantially equal value as the bias current applied by bias current source 144, but applies the current to the down stream side of the MR element 142. Application of a substantially equal bias current to each side of the MR element 142 assures the MR element is held at a substantially constant current during read operations of the disc drive 100. As will be appreciated by those skilled in the art, in an alternate preferred embodiment, the energy source 144 and the energy source 146 are each a voltage source. However, for brevity of description and an enhancement of the understanding of the present invention, but by no means a limitation of the scope of the present invention, the energy sources 144 and 146 shall henceforth be referred to as current sources 144 and 146, which will be read to encompass either current sources 144 and 146 or voltage sources 144 and 146.

As data previously recorded to the rotatable recording surface 109 passes under the MR element 142, a magnetic field indicative of the previously recorded data causes a change in voltage to occur across the MR element 142 to provide a raw read signal. The raw read signal is provided to a differential amplifier 148 of the preamp 136, which amplifies the raw read signal and passes a read signal to the read/write circuitry of the disc drive 100.

Bypass switches are added to the preamp 136 for testing the ferromagnetic resonance frequency or microwave noise response of the MR element 142 responding to an application of a bias current to the MR element 142. An amplifier bypass switch 150 and an energy source bypass switch 152 are added to the preamp 136 to provide single ended access to the MR element 142 between test point 154 and ground 156. With the amplifier bypass switch 150 and the energy source bypass switch 152 in the closed state, a bias current provided by bias current source 144 is applied to the MR element 142. The amount of bias current applied to the MR element 142 depends on the structure and composition of the MR element 142, but will typically be within a range of 2 to 5 milliamps.

In a preferred embodiment, during microwave noise testing of the MR element 142, the amplifier bypass switch 150 and the energy source bypass switch 152 respond to a control line from a serial port register (not shown) by switching from a normally open state to a closed state. In the closed state, the amplifier bypass switch 150 disables the differential amplifier 148 of the preamp 136 from the single ended microwave noise test circuit 140, and the energy source bypass switch 152 disables the bias current source 146 from the test circuit 140 providing a reference to ground.

With the differential amplifier 148 and the bias current source 146 disabled from the test circuit 140, single ended access to the MR element 142 by a spectrum analyzer, such as an Agilent E4405B 12.2 GHz spectrum analyzer, is provided across test point 154 and ground test point 156.

In an alternative preferred embodiment the differential amplifier 148 accommodates a signal frequency bandwidth of 6 GHz. During microwave noise testing of the MR element 142, the amplifier bypass switch 150 remains in a first closed position while the energy source bypass switch 152 responds to the control line from the serial port register by switching from the normally open state to the closed state. In the first closed position, the amplifier bypass switch 150 enables the differential amplifier 148 for inclusion within the single ended microwave noise test circuit 140 while the energy source bypass switch 152 disables or excludes the bias current source 146 from the test circuit 140 and provides a reference to ground.

With the bias current source 146 disabled from the test circuit 140, single ended access to the MR element 142 by a spectrum analyzer is provided across test point 155 and ground test point 156.

Figure 3:
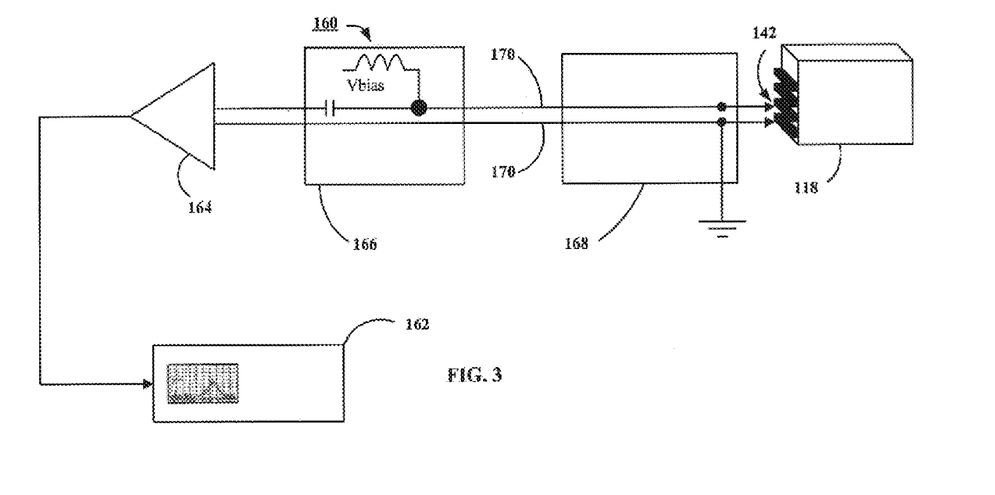
FIG. 3 is a functional block diagram of a test setup for use in testing the condition of the magnetoresistive element of the read/write head of the disc drive of FIG.1.

FIG. 3 shows a test setup 160 used for testing the ferromagnetic resonance frequency of the MR element 142 of the read/write head 118 detached from a load arm 116. A typical ferromagnetic resonance frequency of an intact MR element 142 is in a range of 3 to 6 GHz. The typical ferromagnetic resonance frequency for a given design of a read/write head 118 is determined by the particular structure of the MR element 142 and the combination of material used in forming the MR element 142.

The test setup 160 (also referred to herein as a "microwave noise testing circuit") is independent from and hence accommodates a wide variety of materials or structures of the MR element 142. The test setup 160 includes a spectrum analyzer 162 coupled with a low noise amplifier 164, a variable output bias current source 166 and a test probe 168 appropriately configured, as shown in FIG. 3.

In a preferred embodiment, each lead of a pair of leads 170 is attached across the MR element 142. The test probe 168 is attached to the pair of leads 170 and used to provide input to the spectrum analyzer 162 from the MR element 142 during testing of the read/write head 118. A 50 Ohm airline probe, equipped with an air dielectric coaxial cable, is an appropriate test probe 168 for use under test setup 160.

An Agilent Spectrum Analyzer model E4405B with a frequency range of 12.2 GHz has proven to be useful in measuring the noise spectrum of the MR element 142 responding to an application of a bias current. Additionally, the pair of leads 170 provide direct access to the MR element 142 for the bias current source 166. The level of bias current applied across the MR element 142 during microwave frequency testing depends on the particular structure and composition of the MR element 142, but will typically range between 2 and 5 milliamps. For alternate configurations of MR element 142 the bias current range may be a bit lower or a bit higher, hence the use of the variable output bias current source 166 within test setup 160.

Because the single sided circuit shown by FIG. 3 is used for measuring microwave frequency response of the MR element 142 during testing, there is no need for the bias current source 166 to have special bias circuits that lower noise emanating from the test circuit of the test setup 160. Also supported by the pair of leads 170 is a low noise amplifier 164. For the frequency range encountered during testing of the MR element 142, it is suggested that the low noise amplifier 164 have a 24 dB gain, a bandwidth of 8 GHz with a noise frequency less than 2.5 dB.

FIGS. 4 through 8 show illustrative microwave noise measurement plots obtained from a group of pre-selected read/write heads 118 and measured by the test setup 160 of FIG. 3. Each read/write head 118 used for generation of the microwave noise measurement plots was selected from read/write heads with known characteristics.

Each of the read/write heads 118 were removed from their respective load arms 116 prior to being attached to the pair of leads 170. The current supplied by the variable output bias current source 166 was set at substantially 2.5 milliamps while the resistance of each MR element 142 tested was within the read/write head specification limits, and fell within a range of about 45 to 65 Ohms.

It will be understood that the values provided within the present description are values applicable to a particular MR element 142 configuration and do not impose limitations on the present invention. The values given serve to enhance the understanding of the present invention. When practicing the present invention it will be understood that a test regimen will typically include a variety of bias current levels to gain a more complete perspective of a present "health" and future predicted performance of the MR element 142 over the operating life of the MR element 142.

Figure 4:
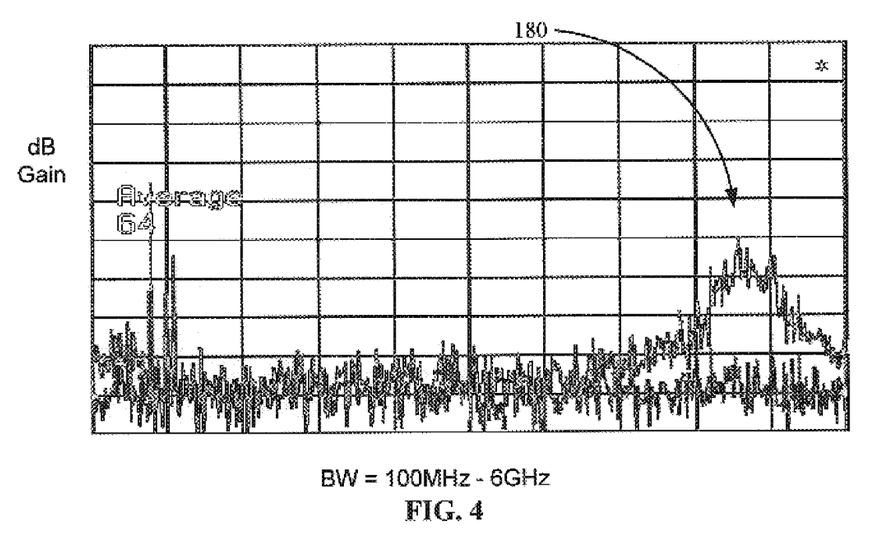
FIG. 4 is a microwave frequency noise plot of a typical non-defective read/write head of the disc drive of FIG. 1.

The microwave frequency response plot shown by FIG. 4 is indicative of a healthy, predicted reliable read/write head 118 with a resistance of 50 ohms and was selected from a group of read/write heads 118 that presented previously stable operating characteristics. A presently healthy MR element 142 that is predicted to be absent reliability issues over its operating life, for the configuration of the MR element 142 used in generating the frequency plots shown by FIGS. 4 through 8, display a high frequency single peak microwave noise signature peaking at substantially 5 GHz, such as 180 of FIG. 4.

Figure 5:
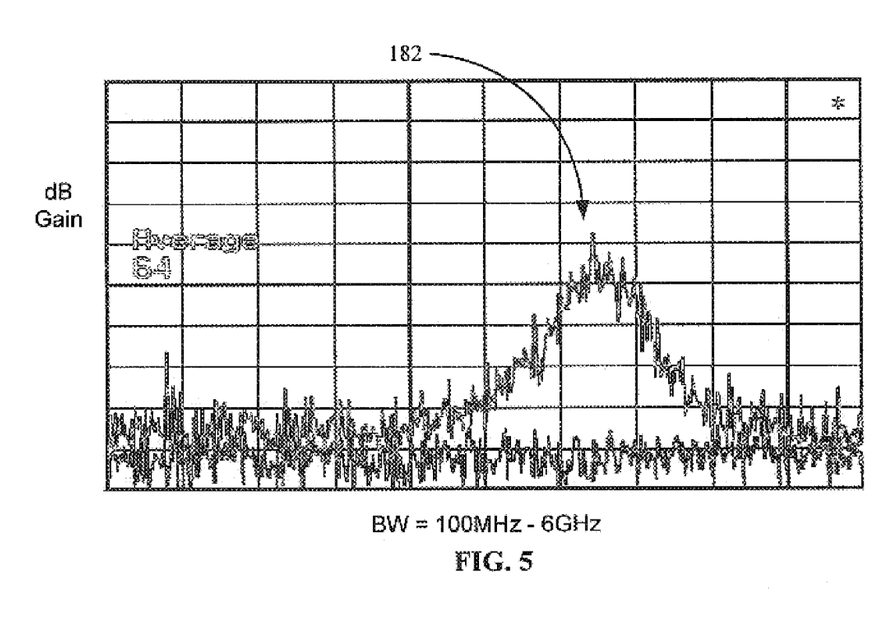
FIG. 5 is a microwave frequency noise plot of a typical marginally defective read/write head of the disc drive of FIG. 1.

Although FIG. 5 shows a single peak microwave noise signature 182, the microwave noise signature 182 is shifted to the left and peaks at substantially 4 GHz. A MR element 142 with a microwave noise signature, such as 182, represents a presently marginally performing MR element 142 that is predicted to potentially incur reliability issues over its operating life.

Figure 6:
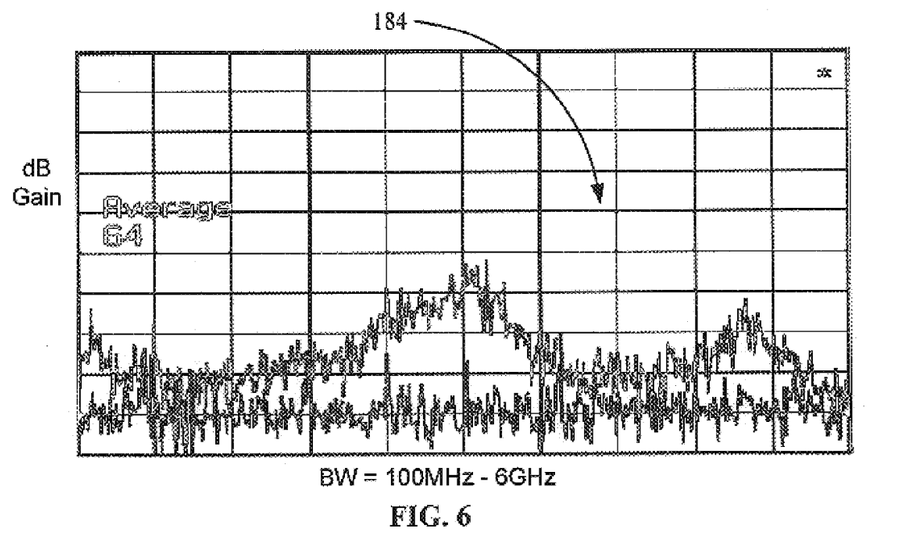
FIG. 6 is a microwave frequency noise plot of a typical defective read/write head of a first type of the disc drive of FIG. 1.
Figure 7:
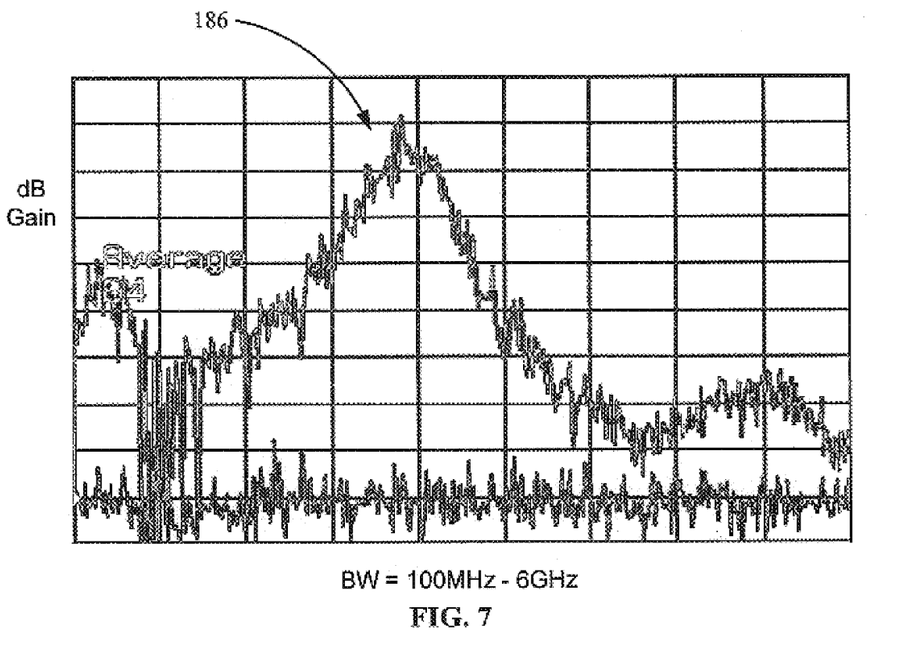
FIG. 7 is a microwave frequency noise plot of a typical defective read/write head of a second type of the disc drive of FIG. 1.
Figure 8:
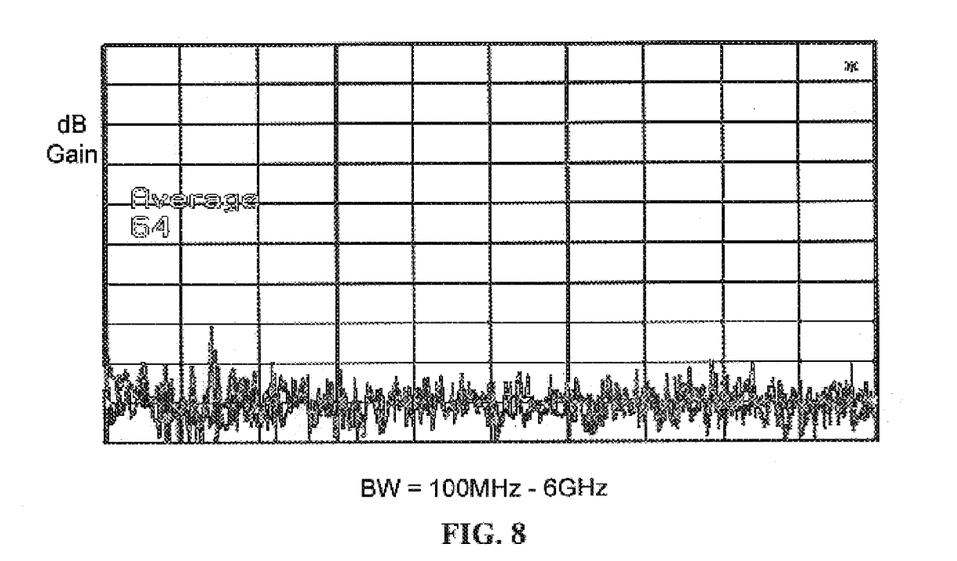
FIG. 8 is a microwave frequency noise plot of a typical dead read/write head of the disc drive of FIG. 1.

A bimodal microwave noise signature, such as 184 of FIG. 6, or a high gain low frequency microwave noise signature peaking at about 3 GHz, such as 186 of FIG. 7, are representative of presently poor performing MR elements 142 that are predicted to incur reliability issues from nearly the onset of their operating lives. The absence of the microwave noise signature, a shown by FIG. 8, is indicative of a dead head.

Again, the microwave noise signatures presented by FIGS. 4 through 8 are microwave noise signatures specific to a particular configuration and composition of MR element 142 and may not necessarily be indicative of microwave noise signatures of MR elements 142 formed from an alternate composition or that demonstrate an alternate configuration. For example, the microwave noise signature 182 of FIG. 5 may be indicative of a presently healthy performing MR element 142 predicted to reliably function over its operating life, that simply has a composition and or configuration different than a composition and configuration of the MR elements 142 used in producing the frequency plots shown by FIGS. 4 through 8.

Figure 9:
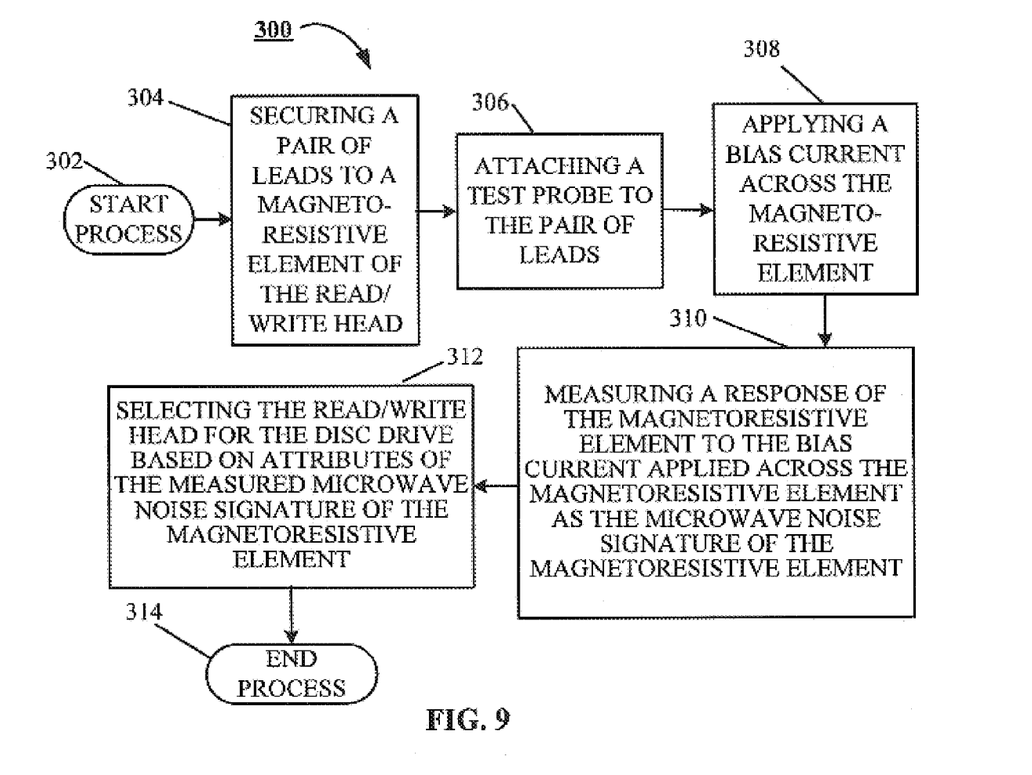
FIG. 9 is a flow chart of a read/write head selection process.

FIG. 9 shows steps for selection process 300 used in selecting a read/write head (such as 118) for use in a disc drive (such as 100) starting at process step 302 and continuing at process step 304 with securing a pair of leads (such as 170) to the magnetoresistive element 142 of the read/write head 118. The selection process 300 continues at process step 306 with an attachment of a test probe (such as 168) to the pair of leads. The selection process 300 continues with an application of a bias current across the magnetoresistive element at process step 308; the bias current is supplied by a variable output current source (such as 166), which communicates with the pair of leads 120. At process step 310 a measurement of a response of the magnetoresistive element to the application of the bias current is made. The measurement of the response of the magnetoresistive element to the application of bias current takes the form of a microwave noise signature (such as 182), and based on the attributes of the microwave noise signature a selection or non-selection of the read/write head for use in the disc drive is made at process step 312. A spectrum analyzer (such as 162) measures the microwave signature via input from a low noise amplifier (such as 166) in line with the current source and the test probe. The selection process concludes with end process step 314.

Accordingly, embodiments of the present invention are directed to a disc drive (such as 100) adapted with a preamplifier (such as 136) configured for measuring microwave noise of a magnetoresistive element (such as 142) of a read/write head (such as 118) of the disc drive. In accordance with one embodiment, a read/write head with a magnetoresistive element and an inductive element access a rotatable disc (such as 109). The magnetoresistive element executes read operations to read the data from the rotatable disc, and the inductive element executes write operations to write the data to the rotatable disc. Included in the disc drive are a pair of current sources (such as 144 and 146) that bias the magnetoresistive element during the read operation as well as during microwave noise measurement testing, and a preamplifier circuit (such as 140) configured for measuring the microwave noise of the biased magnetoresistive element. The preamplifier circuit passing the data to the inductive element during the write operation and receiving the data from the biased magnetoresistive element during the read operation.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method for determining an operative level of a magnetoresistive element comprising steps of:
   biasing the magnetoresistive element; and
   measuring a microwave noise signature response of the biased magnetoresistive element.

2. The method of claim 1, in which the microwave noise signature response of the biased magnetoresistive element is measured by steps comprising:
   securing a pair of leads to the magnetoresistive element of the read/write head;
   attaching a test probe to the pair of leads;
   applying a bias current across the magnetoresistive element; and
   measuring a response of the magnetoresistive element to the bias current applied across the magnetoresistive element as a microwave noise signature of the magnetoresistive element.

3. The method of claim 1, in which the microwave noise signature response of the biased magnetoresistive element is measured by steps comprising:
   securing a pair of leads to the magnetoresistive element of the read/write head;
   attaching a test probe to the pair of leads;
   applying a bias voltage across the magnetoresistive element; and
   measuring a response of the magnetoresistive element to the bias voltage applied across the magnetoresistive element as a microwave noise signature of the magnetoresistive element.

4. The method of claim 2, in which the bias current is supplied by a variable output bias current source.

5. The method of claim 3, in which the bias voltage is supplied by a variable output bias voltage source.

6. The method of claim 2, in which the test probe is a 50 Ohm airline probe comprising an air dielectric coaxial cable.

7. The method of claim 3, in which the test probe is a 50 Ohm airline probe comprising an air dielectric coaxial cable.

8. The method of claim 2, in which the bias current is supplied by a variable output bias current source, the test probe is a 50 Ohm airline probe comprising an air dielectric coaxial cable, and wherein the microwave noise signature is measured by a frequency analyzer having a frequency range of 12.2 GHz.

9. The method of claim 3, in which the bias current is supplied by a variable output bias current source, the test probe is a 50 Ohm airline probe comprising an air dielectric coaxial cable, and wherein the microwave noise signature is measured by a frequency analyzer having a frequency range of 12.2 GHz.

10. A preamplifier circuit configured for measuring a microwave noise signature of a magnetoresistive element biased by a pair of energy sources comprising:
    an amplifier; and
    an energy source bypass switch controllingly referencing the magnetoresistive element to a ground reference.

11. The preamplifier circuit of claim 10, in which the pair of energy sources, is a pair of current sources.

12. The preamplifier circuit of claim 10, in which the pair of energy sources, is a pair of voltage sources.

13. A preamplifier circuit configured for measuring a microwave noise signature of a magnetoresistive element biased by a pair of energy sources comprising:
    a differential amplifier;
    an energy source bypass switch controllingly referencing the magnetoresistive element to a ground reference;
    an amplifier bypass switch disabling the differential amplifier;
    a test point communicating with the amplifier bypass switch providing a single ended access to the biased magnetoresistive element for measuring the microwave noise signature of the biased magnetoresistive element relative to the ground reference; and
    a ground test point communicating with the ground reference for referencing the microwave noise measurement of the biased magnetoresistive element.

14. The preamplifier circuit of claim 13, in which the differential amplifier supports a signal frequency of substantially six gigahertz, and wherein the amplifier bypass switch enables the differential amplifier.

15. The preamplifier circuit of claim 13, in which a first of the pair of energy sources is disabled by the energy source bypass switch and wherein a second of the pair of energy sources is a variable output energy source.

16. The preamplifier circuit of claim 14, in which a first of the pair of energy sources is disabled by the energy source bypass switch and wherein a second of the pair of energy sources is a variable output energy source.

17. The preamplifier circuit of claim 15, in which the pair of energy sources, is a pair of current sources.

18. The preamplifier circuit of claim 15, in which the pair of energy sources, is a pair of voltage sources.

19. The preamplifier circuit of claim 16, in which the pair of energy sources, is a pair of current sources.

20. The preamplifier circuit of claim 16, in which the pair of energy sources, is a pair of voltage sources.

21. A device for storing data comprising:
- a rotatable media storing the data;
- a read/write head with a magnetoresistive element reading the data from the rotatable media; and
- a preamplifier circuit configured for measuring a microwave noise signature of the magnetoresistive element determining an operability of the read/write head by steps for determining an operative level of the magnetoresistive element.

22. The method of claim 1, further comprising a step of:
- determining the operative level of the magnetoresistive element based attributes of the measured microwave signature.

* * * * *